United States Patent [19]

Tessler

[11] 3,719,662

[45] March 6, 1973

[54] STARCH PHOSPHATE ESTERS

[75] Inventor: Martin M. Tessler, Edison, N.J.

[73] Assignee: National Starch and Chemical Corporation, New York, N.Y.

[22] Filed: April 7, 1971

[21] Appl. No.: 132,167

[52] U.S. Cl..........260/233.5, 162/175, 260/233.3 R, 260/233.3 A
[51] Int. Cl. ..............................................C08b 19/04
[58] Field of Search .....260/233.3 R, 233.3 A, 233.5, 260/219

[56] References Cited

UNITED STATES PATENTS 3,553,194   1/1971   Verbanac et al. .................260/233.5

Primary Examiner—Donald E. Czaja
Assistant Examiner—Melvyn I. Marquis
Attorney—Thomas B. Graham

[57] ABSTRACT

A method for the preparation of starch phosphate esters wherein aqueous slurries or dispersions of a starch base are reacted with o-carboxyaryl phosphates or salts thereof. The starch products may also be prepared employing non-aqueous solvents or by means of a dry reaction procedure.

9 Claims, No Drawings

STARCH PHOSPHATE ESTERS

DETAILED DESCRIPTION OF THE INVENTION

This invention relates to a method for the preparation of starch phosphate esters. More particularly, the invention relates to a method for the preparation of starch phosphate esters by the reaction of selected o-carboxyaryl phosphates with a starch base under specified reaction conditions. As used herein, the term "starch phosphate ester" means the monoester of starch and orthophosphoric acid, or any salt or acid salt thereof.

While many methods of starch esterification to produce starch phosphate esters have been proposed and are described in the literature, all of these methods involve dry reaction procedures, and consist, essentially, in heat reacting starch which has been impregnated with a phosphate salt of an alkali metal, within a prescribed pH range. Thus, a representative method of the prior art for phosphorylating starch would involve impregnating starch with dihydrogen sodium phosphate (in an amount of from 2 to 4 percent by weight of the dry starch), at Ph 4 – 8, drying the starch and heating at 120°–130° C. for 1 to 3 hours. Starch reactions which are carried out in aqueous media are, from a large-scale production viewpoint, more efficient and economical.

It is the prime object of this invention to provide a new method for the preparation of starch phosphate esters in aqueous systems. Another object of this invention is to provide an efficient and economical reaction procedure for chemically altering the paste properties of starch. Various other objects and advantages of this invention will be apparent from the following description.

Thus, I have now found that the objects of my invention may be accomplished by the reaction of a selected o-carboxyaryl phosphate, as herein defined, with a desired starch base which is ordinarily suspended in water. The reaction is carried out at temperatures ranging from about 60° – 130° F. and preferably at 95° – 125° F. for periods of 1 to 24 hours. The pH of the reaction medium may be between about 2 – 13, and preferably between 3.0 – 8.0. It is not ordinarily necessary to control the pH of the medium during the reaction. The addition of sodium sulfate to the reaction medium in a concentration of about 40 – 60 percent, based on the weight of the starch, has been found to increase reaction efficiency.

The applicable starch base materials which may be used in preparing the starch phosphate ester products may be derived from any plant source including corn, potato, sweet potato, wheat, rice, sago, tapioca, waxy maize, sorghum, high amylose corn, or the like. Also included are the conversion products derived from any of the latter bases including, for example, dextrines prepared by the hydrolytic action of acid and/or heat; oxidized starches prepared by treatment with oxidants such as sodium hypochlorite; and, fluidity or thin boiling starches prepared by enzyme conversion or by mild acid hydrolysis. The use of the term "starch base" is thus seen to include any amylaceous substance, whether untreated or chemically modified which, however, still retain free hydroxyl groups capable of entering into the phosphorylation reaction of this invention. If the desired product is to be a granular starch then obviously the initial starting material must be in granular form. It is to be noted that the method of this invention may also be carried out employing gelatinized starches which will result in the production of non-granular, starch phosphate esters.

The o-carboxyaryl phosphates useful in preparing the starch phosphate esters of this invention correspond to the following general formula:

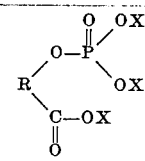

wherein R is selected from the group consisting of phenyl, naphthyl, alkyl substituted phenyl, alkyl substituted naphthyl, the alkyl substituent being up to six carbon atoms, halogen substituted phenyl and halogen substituted naphthyl, and X is hydrogen or other cation such, for example, as sodium, potassium, lithium, calcium, ammonium and the like. In all instances, the carboxylic group attached to R is in the adjacent position with respect to the attachment of the phosphate group.

The preparation of the various o-carboxyaryl phosphates useful herein is well described in the literature. For example, the preparation of salicyl phosphate by the reaction of salicylic acid and phosphorus pentachloride and subsequent hydrolysis of the reaction product has been described by R. Anschuetz and W.O. Emery in Ann. 228, 308 (1885). An improved procedure for the isolation and purification of salicyl phosphate has been reported by J.D. Chanley, E.M. Gindler and H. Sobotka, in J.A.C.S. 74, 4347 (1952). Set forth immediately below are the chemical equations representative of the reactions taking place in the preparation of salicyl phosphate.

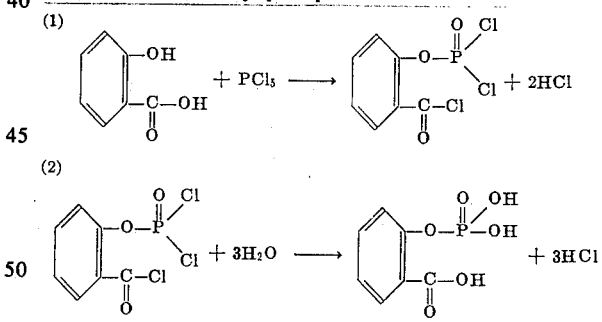

The preparation of o-carboxynaphthyl phosphates is described by J.D. Chanley and E.M. Gindler in J.A.C.S. 75, 4035 (1953).

It is to be noted that it is not a requirement of the method of this invention that the salicyl phosphate (or other o-carboxyaryl phosphate) be isolated and purified before its reaction with the starch. Thus, the reaction intermediate represented by the reaction product of salicylic acid and phosphorus pentachloride can be hydrolyzed in water and the resulting aqueous solution employed without isolation to phosphorylate the starch in accordance with the method of this invention. The resulting aqueous solution, which optionally may be neutralized, can also be evaporated to dryness and the solid residue used to phosphorylate the starch in accordance with the method of this invention. If the salt of the salicyl phosphate is insoluble in water, e.g. the calcium salt of salicyl phosphate, then the solid product may be isolated by filtration.

In more detail, a typical preparation of a starch phosphate ester in accordance with the method of this invention is carried out by admixing a selected o-carboxyaryl phosphate and water. Sodium sulfate may be added to the reaction mixture if desired and serves to enhance the reaction efficiency. The selected base is then added to the resultant mixture. The practitioner will recognize that the order in which the reagents are added to form the reaction mixture is not of particular significance and variations may be employed herein.

The amount of o-carboxyaryl phosphate reagent used to react with the starch base may vary from about 1 to 100 percent, based on the weight of starch, depending on such factors as the selected starch base employed, the degree of modification which is desired in the end product, and the particular o-carboxyaryl phosphate reagent employed in the reaction.

The temperature at which the reaction is run may vary from about 60° – 130° F. Preferably, the reaction is run from about 95° – 125° F.

The pH of the reaction mixture may be adjusted, as desired, with any common acid or base such as hydrochloric acid, sulfuric acid, sodium hydroxide, calcium hydroxide, and the like.

Reaction time will vary from about 1 hour to 24 hours depending on such factors as the reactivity of the reagent used, the amount of reagent used, the temperature employed, etc. After completion of the reaction, the pH of the reaction mixture is preferably adjusted to a pH of from about 5.0 to 7.0 using any common acid such as hydrochloric acid, sulfuric acid, acetic acid, etc. or common base such as aqueous sodium hydroxide. The pH of the reaction will determine whether acid or base is required. The resultant starch product is recovered by filtration and washed free of residual salts with water, and is thereafter dried. Alternatively, the washed product may be drum dried, or spray dried, or gelatinized and isolated by alcohol precipitation.

While aqueous suspensions are preferred for use herein, the reaction may be carried out, if desired, in a non-aqueous liquid medium by suspending the starch base in any common inert, organic solvent such, for example, as acetone, p-dioxane, tetra-hydrofuran, etc. and then adding the required o-carboxyaryl phosphate thereto.

In essence, the starch phosphate esters are produced by the method of this invention as represented by the following reaction

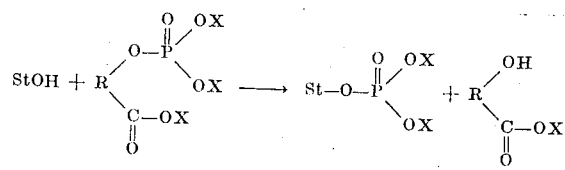

wherein StOH represents the starch molecule and R and X are as defined hereinabove.

If desired, the starch esters of this invention may also be prepared by a dry process. In carrying out a typical dry procedure, the o-carboxyaryl phosphate is added to a small amount of water and the pH of the resulting solution adjusted to 7.0 with 50 percent aqueous sodium hydroxide. The resulting solution is then sprayed or blended into the starch and the mixture thereafter heated (as by placing in an oven) at temperatures ranging from about 80° to 180° F. The reaction period (i.e. heating time) will vary with such factors as the reactivity of the selected o-carboxyaryl phosphate employed, the selected starch base, etc. Reaction periods ranging from about 30 minutes to 7 hours have been found sufficient in most instances, however, and at the end of the reaction period, the treated starch is allowed to cool. If removal of salts and organic by-products is desired, then the starch is slurried in water. The pH of the slurry is adjusted to from 5.0 to 7.0 and the starch product recovered from the slurry by filtration, washed free of residual salts with water and isolated in a manner such as previously described above.

It can be appreciated by the practitioner that a large number of variations may be easily effected in reacting the starch base with the described o-carboxyaryl phosphates in accordance with the aqueous, non-aqueous, or dry reaction procedures described above without departing from the general limitations set forth herein.

Starch phosphate esters may be conveniently divided into two classes. One class comprises monoesters of orthophosphoric acid, wherein only one of the three acidic functions of the acid is esterified with one starch molecule. A second class of starch phosphate esters comprises mixtures of mono-, di- and triesters of orthophosphoric acid in which one, two or three of the acidic functions of the orthophosphoric acid are esterified with starch molecules. The latter starch products are inhibited or cross-bonded starches since the formation of a di- or triester bond yields a cross-bonded network in which two or three starch segments are bonded together. This cross-bonding is known to inhibit the granule swelling power of such starches when cooked in water.

The starch products of this invention have been characterized as the monoesters of orthophosphoric acid by virtue of their complete lack of inhibition. The absence of inhibition was determined by a "sediment volume test," a sensitive test for determining the presence or lack of inhibition. In this procedure, an aqueous dispersion of the starch being tested in a concentration of 0.1 percent, by weight, is cooked on a boiling water bath for about 20 minutes. The cooked dispersion is then cooled and allowed to stand at room temperature in a graduated vessel, such as a 100 ml. graduated cylinder, for a period of about 16 hours. A clear or slightly cloudy dispersion with no layer formation indicates an absence of inhibition. If the starch is inhibited, the cooked dispersion will separate into layers of a clear liquid and an opaque, swollen paste. In cases of extreme inhibition, the starch will completely settle out of solution in the form of a sediment. The sediment constitutes insoluble granules of starch whose swollen volumes are relative to the degree of inhibition of the starch being tested. The starch phosphate esters of this invention yielded very clear dispersions without any sediment formation, indicating the absence of inhibition.

The starch phosphate esters prepared by the method of this invention may be employed as food thickeners in such products as soups, and in canned vegetables and fruits, where a thick-bodied, creamy, relatively clear thickening agent is preferable instead of an opaque, gel-like agent which is obtained with untreated corn and many other cereal starches. Cationic starches which in addition have been also phosphorylated by the method of this invention are useful in the manufacture of paper. These starches are ordinarily incorporated with the stock during the manufacture of paper and such addition results in improved retention of pigments, increased strength and other desirable properties. The application of these cationic, phosphorylated starches in papermaking is described in U.S. Pat. No. 3,459,632. The starch products of this invention also find use as foundry core binders, textile sizes, and ore refining additives.

The following examples will further illustrate the embodiment of the present invention. In these examples all parts are given by weight unless otherwise noted.

EXAMPLE I

This example illustrates a typical preparation of a starch phosphate ester in accordance with the method of this invention.

A total of 2 parts of salicyl phosphate was added to a solution of 12 parts of sodium sulfate in 30 parts of water. The pH of the resultant solution was adjusted to 6.0 with aqueous sodium hydroxide (50 percent, by weight) and 20 parts of waxy maize was added thereto. The resultant starch slurry was allowed to react with agitation for a period of about 16 hours. The temperature of the starch slurry was maintained at about 113° F. through out the entire reaction period. The starch product was thereafter recovered by filtration and washed four times with distilled water, and air dried. On analysis, the starch phosphate ester was found to contain 0.11 percent of phosphorus, by weight.

In a repetition of the above procedure, waxy maize was reacted with salicyl phosphate in similar manner, but the sodium sulfate was purposely omitted. Analysis of this starch product showed it to contain 0.07 percent phosphorus, by weight.

The absence of inhibition was determined by cooking an aqueous dispersion of the starch phosphate ester (0.1 percent, by weight) in a boiling water bath for a period of 20 minutes. The cooked dispersion was then cooled and allowed to stand at room temperature in a 100 ml. graduated cylinder for a period of about 16 hours. A sample of untreated waxy maize was carried through the identical procedure for comparison purposes. Neither one of the two starch phosphate esters formed any sediment and the resultant dispersions if each ester were very clear. The dispersion produced with the untreated waxy maize was cloudy but no layers or sediment were observed. The above results clearly illustrate that phosphorylation of the starch had taken place without producing any inhibition.

EXAMPLE II

This example illustrates additional representative preparations of starch phosphate esters in accordance with the method of this invention.

A total of 2 parts of 5-methylsalicyl phosphate, 5-chlorosalicyl phosphate and 2-carboxy-1-naphthyl phosphate, respectively, was added to a solution of 12 parts of sodium sulfate in 30 parts of water. The pH of each solution was adjusted to 6.2 with aqueous sodium hydroxide. About 20 parts of a corn starch which had been previously hydroxypropylated with 5 percent, based on the weight of starch, of propylene oxide, corn starch which had been acid converted to a degree known in the trade as 75 fluidity, and tapioca starch was added to each of the above solutions, respectively. Each of the three resulting starch slurries was agitated for a period of 16 hours at 113° F. At the completion of the reaction period, each of the starch products was recovered by filtration, washed three times with distilled water, and air dried. On analysis, the starch phosphate esters were found to contain 0.13, 0.09, and 0.22 percent of phosphorus, respectively.

EXAMPLE III

This example illustrates the preparation of additional starch phosphate esters in accordance with the method of this invention employing a variety of temperature and pH levels.

About 1.5 parts of salicyl phosphate was added to a solution of 12 parts sodium sulfate in 30 parts of water. The pH of the solution was adjusted to 6.2 with aqueous sodium hydroxide. About 20 parts of waxy maize which previously had been acid converted to a degree known in the trade as 85 fluidity was added thereto. The resulting starch slurry was agitated for a period of 16 hours at 122° F. At the completion of the reaction period, the starch phosphate ester was recovered by filtration, washed three times with distilled water, and air dried.

Two identical starch phosphate esters were prepared in identical manner except that the reaction temperature was lowered to 104° F. in one instance and lowered to 74° F. in the second instance. The thus-prepared esters contained phosphorus as follows:

| Ester Prepared At | % Phosphorus |
| --- | --- |
| 122°F. | 0.08 |
| 104°F. | 0.08 |
| 74°F. | 0.06 |

In a series of ester preparations, carried out essentially as described above, corn starch was employed as the starch base, while the reaction period was 6 hours and the temperature was maintained at 113° F. The pH level of each reaction mixture, respectively, was 3.0, 4.0, 5.0, 6.0, 7.0, 8.0, 9.0, and 10.0. At the completion of the 6 hour reaction period, each of the starch phosphate esters, respectively, was recovered by filtration, washed three times with distilled water, and air dried. The thus-prepared esters contained phosphorus as follows:

| Ester Prepared at pH | % Phosphorus |
| --- | --- |
| 3.0 | 0.11 |
| 4.0 | 0.12 |
| 5.0 | 0.11 |
| 6.0 | 0.13 |
| 7.0 | 0.10 |
| 8.0 | 0.11 |
| 9.0 | 0.09 |
| 10.0 | 0.04 |

EXAMPLE IV

This example illustrates the preparation of a non-granular starch phosphate ester in accordance with the method of this invention employing a previously gelatinized starch base.

A total of 20 parts of waxy maize which had been previously acid converted to a degree known in the trade as 85 fluidity was added to 60 parts of water, and the resulting suspension was heated in a boiling water bath for a period of 20 minutes. The resulting starch dispersion was cooled to room temperature and a solution comprising 15 parts of salicyl phosphate in 20 parts of water which had been adjusted to pH 6.0 was added thereto. About 32 parts of sodium sulfate was admixed thereto and the resultant starch dispersion was thereafter agitated at 113° F. for a period of 16 hours. The reaction product was dialyzed against distilled water for a period of 24 hours and isolated by precipitation from ethyl alcohol. On analysis, the resultant starch phosphate ester contained 0.63 percent of phosphorus, by weight.

EXAMPLE V

This example illustrates the method of this invention utilizing a non-aqueous solvent system.

About 20 parts of corn starch and 1.5 parts of salicyl phosphate were suspended in 80 parts of acetone. The mixture was refluxed for a period of 6 hours, cooled, and filtered. The starch product was washed three times with distilled water and once with ethyl alcohol, and thereafter air dried. The starch phosphate ester thus produced was found to contain a 0.10 percent phosphorus, by weight.

EXAMPLE VI

This example illustrates the method of this invention utilizing a dry reaction procedure.

A solution of 3 parts salicyl phosphate in 5 parts water was prepared and adjusted to pH 7.0 with aqueous sodium hydroxide (50 percent, by weight). The solution was sprayed onto 25 parts of corn starch and the resulting sprayed starch was agitated for a period of 30 minutes. The sprayed starch was thereafter placed in an oven set at a temperature of 140° F. for a period of 5 hours, after which time the starch was cooled and poured into 35 parts of distilled water. The pH of this suspension was adjusted to 6.0 with dilute hydrochloric acid and the starch was recovered by filtration, washed three times with distilled water and air dried. The resultant starch phosphate ester was found to contain 0.24 percent phosphorus, by weight. When a portion of this starch phosphate ester was gelatinized by heating a suspension of the starch ester in a boiling water bath, a paste was formed of much greater stability and clarity, as compared to untreated corn starch.

EXAMPLE VII

This example illustrates the method of this invention in preparing a starch phosphate which also contains cationic substituent groups.

A total of 1,000 parts of corn starch, 1,250 parts of water, 40 parts of calcium hydroxide and 4 parts of diethylamino-ethylchloride hydrochloride were combined in a suitable container. The mixture was allowed to react with agitation at room temperature for a period of 16 hours. At the completion of the reaction period, the pH of the mixture was adjusted to 3.0 by the addition of hydrochloric acid. The resultant starch produce was recovered by filteration, washed with distilled water, and air dried. On analysis, the product was found to contain 0.32 percent nitrogen, by weight.

In order to phosphorylate the above prepared diethyl-aminoethyl ether of corn starch, 3.0 parts of a reagent comprising the reaction product of salicylic acid and phosphorus pentachloride were added to 62.5 parts of water at room temperature. The pH of the mixture was adjusted to 11.0, and the mixture was stirred until all the reagent was hydrolyzed to the trisodium salt of salicyl phosphate (a period of about one-fourth hours). The pH of the hydrolysis medium was maintained at about 11 throughout the entire period by the addition of aqueous sodium hydroxide. The completion of the hydrolysis was indicated by a stable pH, at which time the pH of the mixture was adjusted to 6.0, and 50 parts of the diethylaminoethyl ether of corn starch described above was added thereto. The resultant aqueous slurry was agitated for a period of 16 hours at 113° F. The slurry was then cooled, and the starch product isolated by filtration, washed four times with distilled water, and air dried. There was no change in the pH of the slurry during the entire 16 hour reaction period. On analysis, the starch product was found to contain 0.065 percent phosphorus, by weight.

An aqueous suspension of the thus prepared starch product in a concentration of 0.1 percent, by weight, was cooked in a boiling water bath for a period of 20 minutes. The cooked dispersion was then allowed to stand in a 100 ml. graduated cylinder at room temperature for a period of about 16 hours. The resultant dispersion remained very clear and no sediment was observed indicating that no inhibition of the starch had taken place.

The starch product prepared as described above contains cationic as well as phosphate ester (anionic) groups, and as such is particularly useful in the manufacture of paper. The described starch product was added to bleached sulfite pulp at a concentration of 0.2 percent, based on the weight of dry pulp, in a conventional papermaking process. Pigment retention values were determined to show the effect of the starch product at pH levels of 4.6, 6.0, and 7.6. Paper sheets were prepared from each of the three pulps by means of the Williams Standard Sheet Mold and were thereafter tested for titanium dioxide pigment retention by the method described in TAPPI Standard No. T413 m.58. Pigment retention values employing the starch product which had been substituted to contain only the cationic group (the starch product prepared above prior to the reaction with the phosphorylating reagent) were also determined in identical manner for comparison purposes. The results of these pigment retention determinations are summarized in the table below.

TABLE I

| Starch Product Employed | Percent Titanium Dioxide Retention at pH | | |
|---|---|---|---|
| | 4.6 | 6.0 | 7.6 |
| Phosphorylated diethylaminoethyl ether of starch (prepared above) | 55 | 75 | 54 |
| Diethylaminoethyl ether of starch (prepared above) | 42 | 57 | 56 |

The above data illustrate the improved pigment retention values which are obtained with the phosphorylated cationic starch as compared with a cationic starch at pH 4.6 and 6.0

EXAMPLE VIII

This example illustrates the preparation of a starch phosphate which also contains cationic substituent groups whereby the phosphorylation occurs at high pH and calcium hydroxide is used to control the pH.

A total of 1.8 parts of the reaction product of salicylic acid and phosphorus pentachloride was added to a slurry of 2.0 parts calcium hydroxide and 42.5 parts water. The mixture was stirred at room temperature for 30 minutes at which time all of the reagent was hydrolyzed to the calcium salt of salicyl phosphate. The pH was lowered to 8.0 with hydrochloric acid and 1.35 parts diethylaminoethylchloride hydrochloride, 1.8 parts calcium hydroxide and 30 parts corn starch were added thereto. The pH of the resulting mixture was 12.1. The mixture was allowed to react with agitation at 115° F. for a period of 16 hours. At the completion of the reaction period, the pH of the mixture was lowered to 3.0 by the addition of hydrochloric acid. The resultant starch product was recovered by filtration, washed four times with distilled water, and air dried. On analysis, the product was found to contain 0.05 percent phosphorus and 0.30 percent nitrogen, by weight.

An aqueous suspension of the thus prepared starch product in a concentration of 0.1 percent, by weight, was cooked in a boiling water bath for a period of 20 minutes. The cooked dispersion was then allowed to stand in a 100 ml. graduated cylinder at room temperature for a period of about 16 hours. The resulting dispersion remained very clear and no sediment was observed indicating that no inhibition of the starch had taken place.

The starch product prepared as described above was tested for pigment retention as described in Example VII. Pigment retention values employing a starch product which had been substituted to contain only the cationic group (the starch product prepared as above, but without the salicyl phosphate reagent) were also determined for comparison purposes. The results of these pigment retention determinations are summarized in Table II below.

TABLE II

| Starch Product Employed | Percent Titanium Dioxide Retention at pH | | |
|---|---|---|---|
| | 4.6 | 6.0 | 7.6 |
| Phosphorylated diethylaminoethyl ether of starch (prepared above) | 48 | 69 | 58 |
| Diethylaminoethyl ether of starch (prepared above) | 37 | 49 | 58 |

The above data illustrate the improved pigment retention values which are obtained with the phosphorylated cationic starch as compared with a cationic starch at pH 4.6 and 6.0.

Summarizing, it is thus seen that this invention provides a novel method for the preparation of starch phosphate esters. Moreover, the invention provides an efficient and economical reaction procedure for chemically altering the paste properties of starch.

Variations may be made in proportions, procedures and materials without departing from the scope of this invention which is defined by the following claims.

What is claimed is:

1. A method for the preparation of starch phosphate esters comprising:

a. reacting a starch base with a compound corresponding to the formula

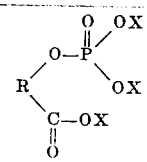

wherein R is selected from the group consisting of phenyl, naphthyl, alkyl substituted phenyl, alkyl substituted naphthyl, halogen substituted phenyl and halogen substituted naphthyl, and X is a cation, and wherein the carboxylic group attached to R is in the adjacent position with respect to the phosphate ester group; and thereupon b. isolating the resultant starch product.

2. The method of claim 1, wherein said reaction is conducted in an aqueous medium at a pH level of from about 2 – 13.

3. The method of claim 1, wherein said reaction is conducted at a temperature of from about 60° – 130° F. and for a period of from 1 to 24 hours.

4. The method of claim 1 wherein said starch base is reacted with a salicyl phosphate.

5. The method of claim 1, wherein said reaction is conducted in a non-aqueous liquid medium.

6. The method of claim 1, wherein said reaction is conducted employing a substantially dry reaction medium.

7. The method of claim 1, wherein said starch base is a gelatinized starch.

8. The method of claim 1, wherein said starch base contains cationic substituent groups.

9. The method of claim 1, wherein said starch base contains diethyl aminoethyl groups.

* * * * *